United States Patent
Reynolds et al.

(10) Patent No.: US 8,505,232 B2
(45) Date of Patent: Aug. 13, 2013

(54) DUAL COLOR REVERSIBLE LIGHTED SLIP BOBBER

(76) Inventors: Erwin B Reynolds, Fridley, MN (US); Dawn H Reynolds, Fridley, MN (US)

(*) Notice: Subject to any disclaimer, the term of this patent is extended or adjusted under 35 U.S.C. 154(b) by 0 days.

(21) Appl. No.: 13/429,984

(22) Filed: Mar. 26, 2012

(65) Prior Publication Data

US 2013/0014425 A1 Jan. 17, 2013

Related U.S. Application Data

(60) Provisional application No. 61/507,057, filed on Jul. 12, 2011.

(51) Int. Cl.
*A01K 93/00* (2006.01)

(52) U.S. Cl.
USPC .............. 43/17.5; 43/44.9; 43/44.91

(58) Field of Classification Search
USPC .................. 43/17.5, 17, 44.87, 44.9, 44.91
See application file for complete search history.

(56) References Cited

U.S. PATENT DOCUMENTS

| | | | | | |
|---|---|---|---|---|---|
| 1,489,088 | A | * | 4/1924 | Mcmindes | 43/44.9 |
| 2,205,352 | A | * | 6/1940 | Fisher | 43/17 |
| 2,225,214 | A | * | 12/1940 | Goertzen | 43/17 |
| 2,236,215 | A | * | 3/1941 | Klinitski | 43/17.5 |
| 2,272,802 | A | * | 2/1942 | High et al. | 43/17.5 |
| 2,431,420 | A | * | 11/1947 | Pope, Sr. | 43/17.5 |
| 2,485,087 | A | * | 10/1949 | Diamond | 43/17.5 |
| 2,527,956 | A | * | 10/1950 | Peevey | 43/17.5 |
| 2,547,308 | A | * | 4/1951 | Dean | 43/17.5 |
| 2,709,316 | A | * | 5/1955 | McCabe | 43/17.5 |
| 2,779,122 | A | * | 1/1957 | De Groff | 43/44.9 |
| 2,957,266 | A | * | 10/1960 | Pfister | 43/44.91 |
| 3,023,532 | A | * | 3/1962 | Gorenty | 43/17 |
| 3,041,771 | A | * | 7/1962 | Hreno | 43/17.5 |
| 3,056,229 | A | * | 10/1962 | Haney | 43/44.91 |
| 3,337,981 | A | * | 8/1967 | Bowman | 43/44.91 |
| 3,613,289 | A | * | 10/1971 | Wehren | 43/44.9 |
| 3,693,278 | A | * | 9/1972 | Mahone, Jr. | 43/17.5 |
| 3,918,191 | A | * | 11/1975 | Williamson | 43/17 |
| 4,109,405 | A | * | 8/1978 | Ito | 43/17.5 |
| 4,437,256 | A | * | 3/1984 | Kulak | 43/17.5 |
| 4,458,439 | A | * | 7/1984 | Garrett, Sr. | 43/44.91 |
| 4,461,114 | A | * | 7/1984 | Riead | 43/17.5 |
| 4,486,969 | A | * | 12/1984 | Swenson | 43/17 |
| 4,658,532 | A | * | 4/1987 | McFarland et al. | 43/17.5 |
| 4,696,125 | A | * | 9/1987 | Rayburn | 43/44.9 |

(Continued)

FOREIGN PATENT DOCUMENTS

DE 3714124 A1 * 11/1987
DE 3727501 A1 * 3/1989

(Continued)

*Primary Examiner* — Darren W Ark
(74) *Attorney, Agent, or Firm* — Geiser Law PLLC; Greg N. Geiser

(57) ABSTRACT

A slip style bobber comprising a hollow central housing constructed from a first mating half and second mating half. The hollow central housing includes a mounting member for the attachment of a pair of printed circuit boards having a replaceable power source, a switch, and a light source. A pair of tubes arranged coaxial are received within mounting member and extend from the interior of the housing to the exterior of the bobber. The bobber is water tight and constructed out of a translucent plastic to allow for illumination of the device during low light conditions. The bobber is multi colored and reversible.

4 Claims, 3 Drawing Sheets

(56) References Cited

U.S. PATENT DOCUMENTS

| | | | |
|---|---|---|---|
| 5,119,578 A * | 6/1992 | Johnson | 43/17.5 |
| 5,274,945 A * | 1/1994 | Ross | 43/17.5 |
| 5,351,431 A * | 10/1994 | Ryu | 43/17.5 |
| 5,398,440 A * | 3/1995 | Amundsen | 43/44.91 |
| 5,404,668 A * | 4/1995 | Christensen | 43/44.87 |
| 5,615,512 A * | 4/1997 | Wang | 43/17.5 |
| 5,852,894 A * | 12/1998 | Shannon et al. | 43/44.9 |
| 5,898,372 A * | 4/1999 | Johnson et al. | 43/17.5 |
| 5,915,941 A * | 6/1999 | Casey | 43/17.5 |
| 5,974,721 A * | 11/1999 | Johnson et al. | 43/17.5 |
| 6,671,994 B1 * | 1/2004 | Klein | 43/17.5 |
| 6,966,139 B2 * | 11/2005 | Izzard | 43/44.9 |
| 7,082,711 B2 * | 8/2006 | Adams | 43/17.5 |
| 7,131,231 B1 * | 11/2006 | Lee | 43/17.5 |
| 7,225,580 B1 * | 6/2007 | Chou | 43/17.5 |
| 8,161,678 B1 * | 4/2012 | DeLucca | 43/44.9 |
| 8,341,871 B2 * | 1/2013 | Kavanaugh | 43/44.9 |
| 2007/0227058 A1 * | 10/2007 | Adams | 43/17.5 |
| 2009/0013586 A1 * | 1/2009 | Bennis | 43/44.91 |
| 2009/0255165 A1 * | 10/2009 | Myers | 43/44.91 |
| 2009/0272021 A1 * | 11/2009 | Bennis | 43/44.91 |
| 2010/0058643 A1 * | 3/2010 | Morris et al. | 43/17.5 |
| 2010/0281757 A1 * | 11/2010 | Bennis | 43/44.9 |

FOREIGN PATENT DOCUMENTS

| | | | |
|---|---|---|---|
| DE | 10003850 A1 * | 8/2001 | |
| EP | 235604 A1 * | 9/1987 | |
| FR | 2832784 A1 * | 5/2003 | |
| FR | 2832785 A1 * | 5/2003 | |
| GB | 2295074 A * | 5/1996 | |
| JP | 04349839 A * | 12/1992 | |
| JP | 08196176 A * | 8/1996 | |
| JP | 10276643 A * | 10/1998 | |
| JP | 2000060386 A * | 2/2000 | |
| JP | 2000197434 A * | 7/2000 | |
| JP | 2000236788 A * | 9/2000 | |
| JP | 2001086909 A * | 4/2001 | |
| JP | 2001346486 A * | 12/2001 | |
| JP | 2004242653 A * | 9/2004 | |
| JP | 2004275164 A * | 10/2004 | |
| JP | 2006081465 A * | 3/2006 | |
| JP | 2007020542 A * | 2/2007 | |
| JP | 2008125473 A * | 6/2008 | |
| JP | 2008187925 A * | 8/2008 | |
| JP | 2010178643 A * | 8/2010 | |
| JP | 2012165735 A * | 9/2012 | |
| WO | WO 2005074678 A1 * | 8/2005 | |
| WO | WO 2009110696 A1 * | 9/2009 | |

* cited by examiner

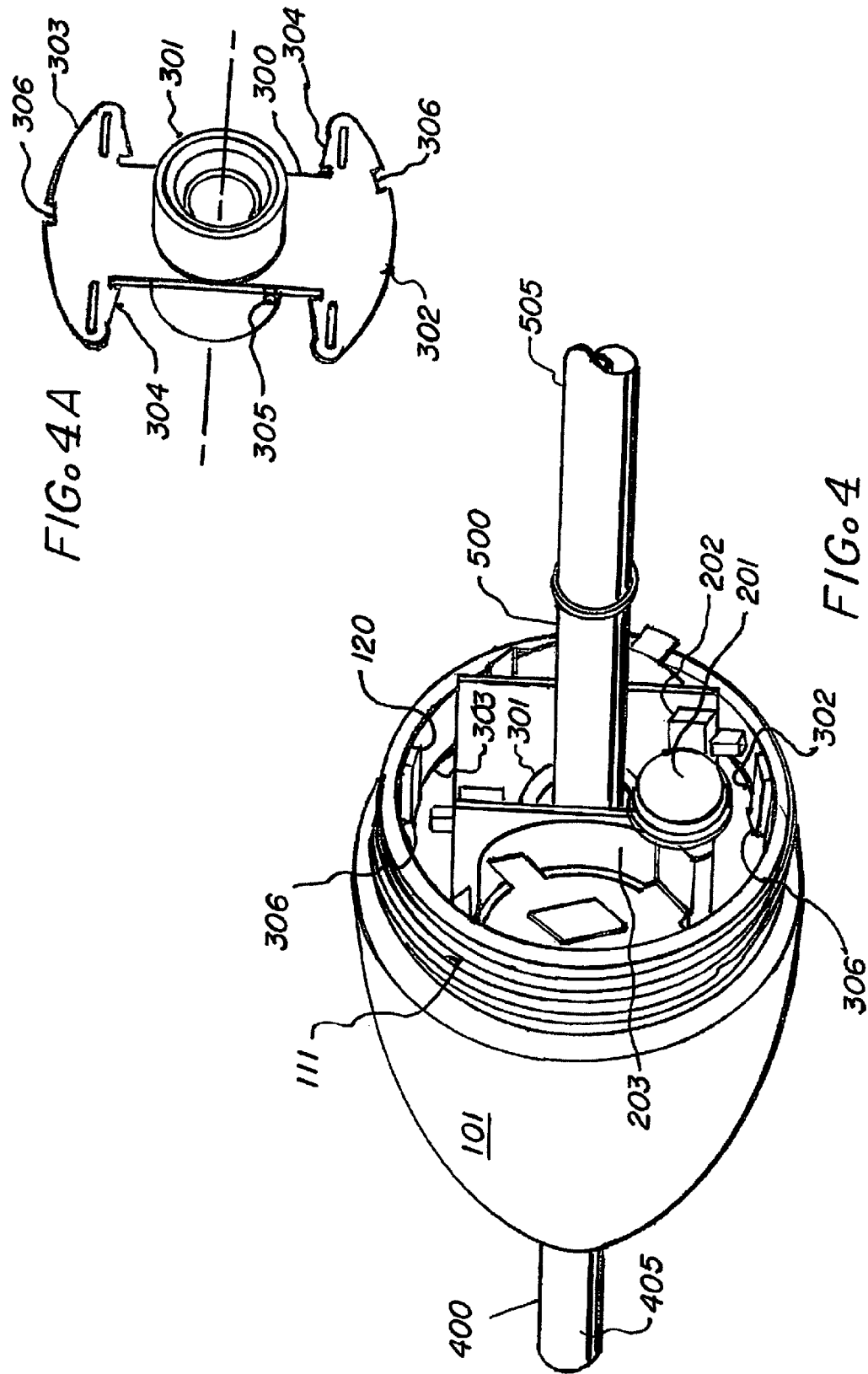

DUAL COLOR REVERSIBLE LIGHTED SLIP BOBBER

CROSS REFERENCE TO RELATED APPLICATIONS

This application claims the benefit of provisional application Ser. No. 61/507,057, filed 2011 Jul. 12 by the present inventors.

FEDERALLY SPONSORED RESEARCH

Not Applicable

SEQUENCE LISTING OR PROGRAM

Not Applicable

FIELD OF THE INVENTION

The present invention relates to slip style bobber that is both lighted and reversible.

BACKGROUND OF THE INVENTION

A bobber is a small float attached to a fishing line to suspend a lure or baited hook at a desired depth and to indicate when a fish has bit or swallowed the bait by moving or "bobbing" below the surface. A typical bobber attaches to the fishing line at a desired depth by being tied to or otherwise affixed to the line using a latching or hooking mechanism. Because a traditional bobber is affixed to the line at a desired depth, the depth cannot be set too deep, due to casting problems, the line cannot be fully reeled in, due to the fixed point of the bobber, and the line can be become damaged. Therefore, a slip bobber was created to solve these problems.

The slip bobber is a style of fishing bobber in which the bobber is allowed to travel freely on a fishing line. A typical slip bobber consists of a float and a tube located central to the float to allow for the passage of the fishing line through the float. In use, a user will affix a slip knot larger than the diameter of the tube to the fishing line to adjust the depth of fishing. This knot prevents the line from passing through the tube maintaining the proper depth of fishing. Additionally, the knot is small enough to pass through the rod guides and not interfere with the reel or reel mechanism.

Although a standard slip bobber has been proven to work for its intended purpose, various improvements to the bobber are required to improve visibility during fishing, to allow for reversibility of the bobber, and to improve the longevity of the bobber.

SUMMARY OF THE INVENTION

The present invention provides an improved slip bobber that is both reversible and illuminated to increase visibility at night. Further, this illuminated slip bobber includes an on/off switch and replaceable batteries to increase the longevity of both the batteries and the device.

The reversible illuminated slip bobber includes a hollow central housing composed of a first mating half and a second mating half, a pair of printed circuit boards ("PCBs") including a light source, a switch, and a power source, a mounting member, a first slip tube including a first pair of o-ring gaskets, a second slip tube including a second pair of o-ring gaskets, and a central o-ring gasket.

The hollow central housing is assembled from the joining of the first mating half and the second mating half. Each mating half is conical in shape having a wide end and a narrow end. The narrow end includes an aperture sized to receive the slip tube. The wide ends are adapted to be removably joined together in a water tight seal. Preferably this joint is a screw type joint with the first mating half having a male end and the second mating half having a female end adapted to receive the male end. To make this joint water tight, a central o-ring gasket is restrained between this joint. Preferably, the first mating half includes a rib to engage the mounting member and prevent rotation of the mounting member within the housing.

The hollow central housing is designed to provide buoyancy to keep the bobber floating on the surface of the water and is composed of translucent plastic to allow for the transmission light from within the housing to the exterior of the bobber. Additionally, the first mating half and the second mating half are composed of a different color plastic. This difference in color of the first mating half and the second mating half allows the device to be reversible, wherein the user may remove the bobber from the fishing line, turn the bobber endwise 180 degrees and reinstall the bobber onto the fishing line. This reversibility allows multiple users fishing in close vicinity to have a different color bobber visible on the surface. Preferably several different colors are available to allow for a multitude of color combinations and customization.

The mounting member is disposed within the hollow central housing to secure the electronic components of the device. The mounting member includes a central tubular cavity to receive the first slip tube coaxial to the second slip tube, a first lobe positioned at the midpoint of a length of the central tubular cavity, and a second lobe opposite the first lobe, wherein the lobes are in communication with a sidewall of the central housing. Each lobe includes a groove and a raised detent to secure and retain the PCBs within the mounting member. Preferably, the lobes include a notch to engage the rib to secure the mounting member within the housing.

The PCBs are designed to be received within the housing and secured to the mounting member. The PCBs engage the raised detent and are sized to be received within the groove. The PCBs include a power source, a switch, and a light source. Preferably the light source is a light emitting diode ("LED") and the power source is a pair of small button style batteries, although other sources of light and power with similar sizes and properties may be used. The switch transfers power from the batteries through the PCB and to the light source where the stored energy of the battery illuminates the light source. The light source may be colored to correspond to or enhance the color of the plastic of the housing.

A first slip tube and second slip tube are removably received coaxial within the central tubular cavity of the mounting member at an interior end of the slip tube. The first slip tube and the second slip tube are identical in size, shape, and features. The fishing line is threaded through the slip tubes in use. The slip tubes are hollow cylinders defining a diameter with an inner side, an outer side, the interior end, and an exterior end. The interior end includes a pair of radial grooves extending along the diameter of the outer side for the receipt of the pair of o-ring gaskets. The o-ring gaskets have a diameter corresponding to the diameter of the slip tube and provide a water tight seal.

The exterior end extends outward from the interior of the cavity to the exterior of the device through the aperture of the housing. The exterior end of the tube is secured within the aperture with adhesive to create a water tight seal. In use the first slip tube and second slip tube will be permanently secured to the first mating half and the second mating half using adhesive to seal and secure the tubes with the aperture. Preferably the slip tubes will be transparent to allow for the transmission of light from the light source.

In use, the slip bobber will be packaged in its assembled form. To use the bobber according to the present invention, the user will thread the fishing line through the first slip tube and the second slip tube, wherein the bobber will travel along the length of the fishing line. To illuminate the bobber, the user will open the bobber by separating the first mating half and second mating half of the housing. This separation will give the user access to the PCBs within the housing. The user will activate the appropriate switch to illuminate the desired half. The user may also replace worn out batteries, if necessary. To turn off the light, the process is reversed. Additionally, the device is easily reversed to an alternate color by flipping the device over and rethreading the line through the device.

The illumination of the device will increase the visibility of the device during low light or no light conditions. Typically, a user will only illuminate the half of the bobber seen above the surface of water, so as to not disturb the fish, although the light source for each half of the bobber can be illuminated independently.

In the preferred embodiment of the present invention, the device is sold with both a one inch (1 in.) diameter and a one and one half inch (1.5 in.) diameter. Although, these are the preferred diameters, the necessary parts may be adapted to various sizes and diameters by changing their scale to accommodate a larger or smaller size. Additionally, various colored housing and light members may be used and sold to allow for a myriad of customizable color configurations.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein:

FIG. 4 is a perspective view of the internal components installed in the device, according to the present invention; and FIG. 4A is a perspective view of the mounting member of the device, according to the present invention.

DETAILED DESCRIPTION OF THE INVENTION

Figure 1:
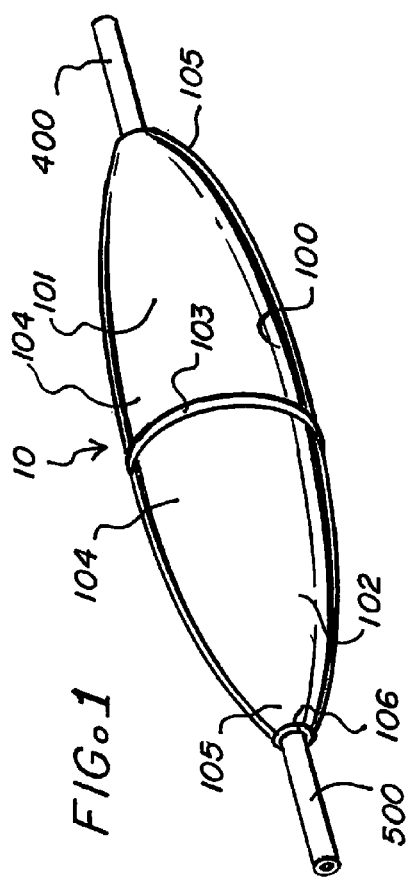
FIG. 1 is a perspective view of device, according to the present invention.
Figure 2:
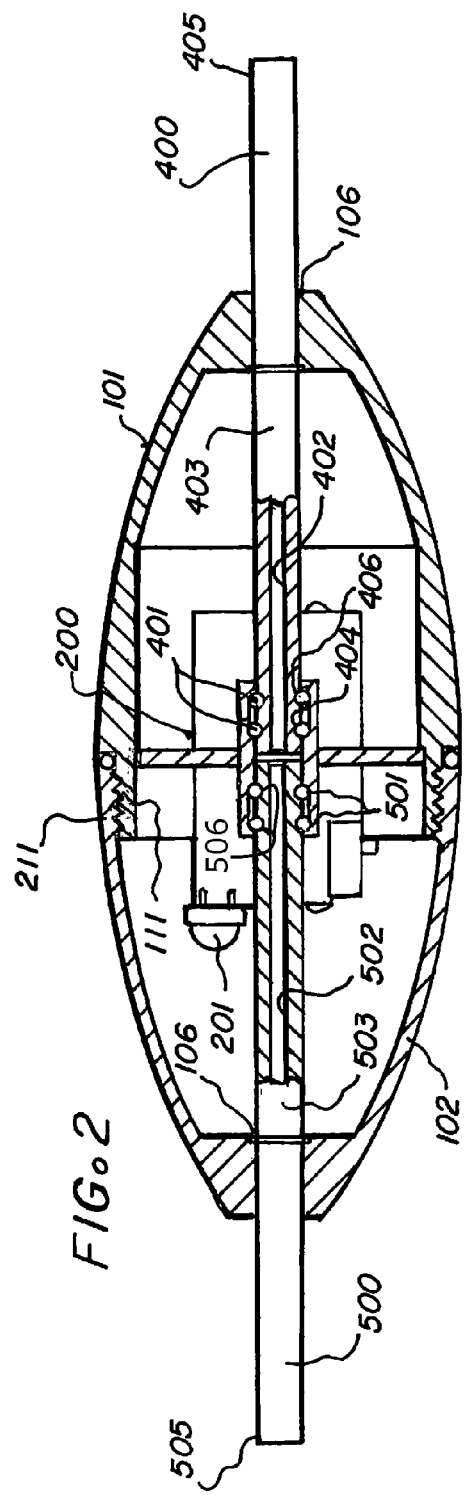
FIG. 2 is a side view of the device, according to the present invention.
Figure 3:
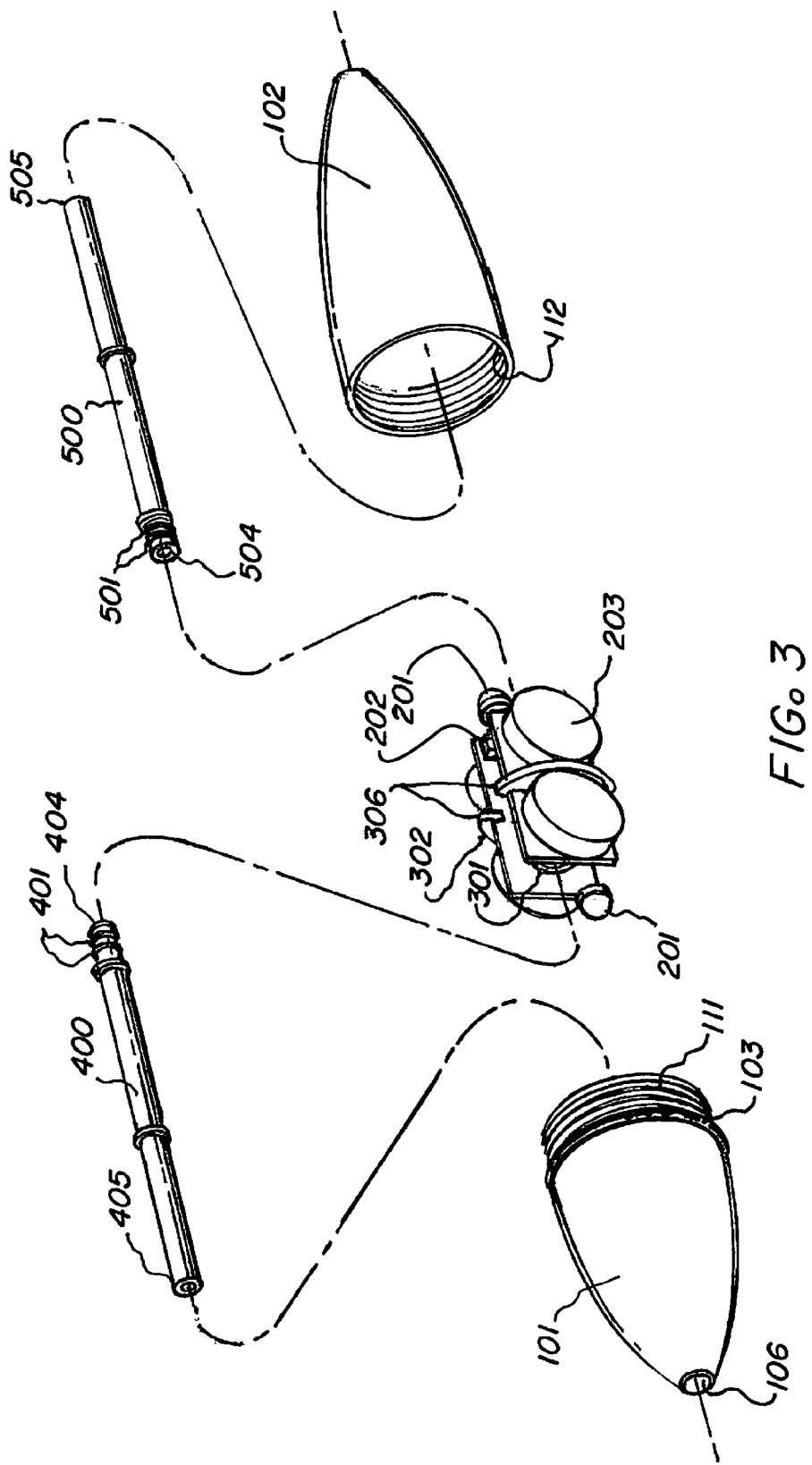
FIG. 3 is an exploded view of the device, according to the present invention.

Referring now to FIGS. 1-4A of the reversible illuminated slip bobber according to the present invention is generally referred to as 10. This bobber 10 is designed to float upon the surface of the water and alert a user to the presence of a fish on the attached line. This bobber 10 illuminates at night to increase visibility and is reversible to allow users fishing in close proximity to have a different visible appearance of the bobber to prevent confusion. The bobber 10 is rigged similar to a traditional slip bobber using a slip knot to control the depth of the line relative to the bobber. Further, this illuminated slip bobber includes an on/off switch and replaceable batteries to increase the longevity of both the batteries and the device.

According to the standard configuration of a slip bobber, the bobber 10 is slipped onto the fishing line of the user and allowed to slide freely on this line. A user will establish the appropriate depth to fish at and affix a slip knot to the line at this point. This slip knot is constructed of a size to allow for the knot to pass through the rod guides, but not through the slip bobber itself. This allows the user to easily reel in and cast the lure without having to worry about the depth setting of the bobber and prevents damage to the fishing line as the bobber is not directly affixed to the fishing line.

The reversible illuminated slip bobber 10 includes a hollow central housing 100 composed of a first mating half 101 and a second mating half 102, a pair of printed circuit boards ("PCBs") 200 including a light source 201, a switch 202, and a power source 203, a mounting member 300, a first slip tube 400 including a first pair of o-ring gaskets 401, a second slip tube 500 including a second pair of o-ring gaskets 501, and a central o-ring gasket 103.

The hollow central housing 100 is assembled from the joining of the first mating half 101 and the second mating half 102. Each mating half 101, 102 is conical in shape having a wide end 104 and a narrow end 105. The narrow end 105 includes an aperture 106 sized to receive one of the slip tubes 400, 500. The wide ends 104 are adapted to be removably joined together in a water tight seal. Preferably this joint is screw type joint with the first mating half 101 having a male end 111 and the second mating half 102 having a female end 112 adapted to receive the male end 111. To make this joint water tight, a central o-ring gasket 103 is restrained between this joint. Preferably, the first mating half 101 includes a rib 120 to engage the mounting member 300 and prevent rotation of the mounting member 300 within the housing.

The hollow central housing 100 is designed to provide buoyancy and keep the bobber 10 floating on the surface of the water. The hollow central housing 100 is composed of translucent plastic to allow for the transmission light from within the housing 100 to the exterior of the bobber 10. Additionally, the first mating half 101 and the second mating half 102 are composed of a different color plastic. This difference in color of the first mating half 101 and the second mating half 102 allows the device to be reversible, wherein the user may remove the bobber 10 from the fishing line, turn the bobber endwise 180 degrees and reinstall the bobber 10 onto the fishing line. This reversibility allows multiple users fishing in close vicinity to have a different color bobber visible on the surface. Preferably several different colors are available to allow for a multitude of color combinations and customization.

The mounting member 300 is disposed within the hollow central housing 100 to secure the electronic components of the device 10. The mounting member 300 includes a central tubular cavity 301 to receive the first slip tube 400 coaxial to the second slip tube 500, a first lobe 302 positioned at the midpoint of a length of the central tubular cavity 301, and a second lobe 303 opposite the first lobe 302, wherein the lobes are in communication with a sidewall of the central housing 100. Each lobe 302, 303 includes a groove 304 and a raised detent 305 to secure and retain the PCBs 200 within the mounting member 300. Preferably, the lobes 302, 303 include a notch 306 to engage the rib 120 to secure the mounting member 300 within the housing 100.

The PCBs 200 are designed to be received within the housing 100 and secured to the mounting member 300. The PCBs 200 engage the raised detent 305 and are sized to be received within the groove 304. The PCBs 200 include a power source 203, a switch 202, and light source 201. Preferably the light source 201 is a light emitting diode ("LED") and the power source 203 is a pair of small button style batteries, although other sources of light and power with similar sizes and properties may be used. The switch 202 transfers power from the batteries 203 through the PCB 200 and to the light source 201 where the stored energy of the battery illuminates the light source 201. The light source 201 may be colored to correspond to or enhance the color of the plastic of the housing 100 the light source 201 illuminates.

A first slip tube 400 and second slip tube 500 are removably received coaxial within the central tubular cavity 301 of the mounting member 300 at an interior end 404, 504 of the slip tube 400, 500. The first slip tube 400 and the second slip tube 500 are identical in size, shape, and features. The fishing line is threaded through the slip tubes 400, 500 in use. The slip tubes 400, 500 are hollow cylinders defining a diameter with an inner side 402, 502, an outer side 403, 503, the interior end 404, 504, and an exterior end 405, 505. The interior end 404, 504 includes a pair of radial grooves 406, 506 extending along the diameter of the outer side 403, 503 for the receipt of the pair of o-ring gaskets 401, 501. The o-ring gaskets 401, 501 have a diameter corresponding to the diameter of the slip tube 400, 500 and provide a water tight seal.

The exterior end 405, 505 extends outward from the interior of the housing 100 to the exterior of the device 10 through the aperture 106 of the housing 100. The exterior end 405, 505 of the tube 400, 500 is secured within the apertures 106 with adhesive to create a water tight seal. In use the first slip tube 400 and second slip tube 500 will be permanently secured to the first mating half 101 and the second mating half 102 using adhesive to seal and secure the tubes 400, 500 with the apertures 106. Preferably the slip tubes 400, 500 will be transparent to allow for the transmission of light from the light source 201.

In use the slip bobber 10 will be packaged in its assembled form. To use the bobber 10 according to the present invention, the user will thread the fishing line through the first slip tube 400 and the second slip tube 500, wherein the bobber 10 will travel along the length of the fishing line. To illuminate the bobber 10, the user will open the bobber 10 by separating the first mating half 101 and second mating half 102 of the housing 100. This separation will give the user access to the PCBs 200 within the housing 100. The user will activate the appropriate switch 202 to illuminate the desired half 101, 102. The user may also replace worn out batteries 203, if necessary. To turn off the light 201, the process is reversed. Additionally, the device 10 is easily reversed to an alternate color by flipping the device 10 over and rethreading the line through the device 10.

The illumination of the device 10 will increase the visibility of the device during low light or no light conditions. Typically, a user will only illuminate the half of the bobber 10 seen above the surface of water, so as to not disturb the fish, although the light source 201 for each half of the bobber can be illuminated independently.

In the preferred embodiment of the present invention, the device is sold with both a one inch (1 in.) diameter and a one and one half inch (1.5 in.) diameter. Although, these are the preferred diameters, the necessary parts may be adapted to various sizes and diameters by changing their scale to accommodate a larger or smaller size. Additionally, various colored housing 100 and light members 201 may be used and sold to allow for a myriad of customizable color configurations.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the appended claims.

The invention claimed is:

1. A slip style bobber for fishing comprising:
a hollow central housing constructed from a joining of a first mating half and a second mating half;
the first and the second mating halves being conically shaped and each having a wide end and a narrow end, the narrow ends each including an aperture, the wide ends adapted to be joined to create the hollow central housing;
a pair of printed circuit boards, the printed circuit boards each having a power source, a light source, and a switch;
a mounting member received within the hollow central housing, the mounting member having a central tubular cavity, a first lobe, and a second lobe opposite the first lobe, the lobes each having a groove and a raised detent for securing the printed circuit boards;
a first slip tube received within the central tubular cavity, the first slip tube cylindrically shaped with a diameter and having an inner side, an outer side, an interior end, and an exterior end, the interior end having a pair of radial grooves extending along a diameter of the outer side, the exterior end extending from an interior of the housing to an exterior of the bobber through the aperture of the narrow end of the first mating half;
a pair of o-ring gaskets received within the radial grooves of the first slip tube;
a second slip tube received within the central tubular cavity coaxial to the first slip tube, the second slip tube cylindrically shaped with a diameter and having an inner side, an outer side, an interior end, and an exterior end, the interior end having a pair of radial grooves extending along a diameter of the outer side, the exterior end extending from the interior of the housing to the exterior of the bobber through the aperture of the narrow end of the second mating half, wherein the second slip tube is identical to the first slip tube;
a pair of o-ring gaskets received within the radial grooves of the second slip tube; and
a central o-ring gasket restrained between a joint of the first mating half and the second mating half.

2. The slip style bobber as claimed in claim 1, wherein the first mating half includes a rib to be received in notches of the first lobe and second lobe.

3. The slip style bobber as claimed in claim 1, wherein the light source is a light emitting diode.

4. The slip style bobber as claimed in claim 1, wherein the first mating half and the second mating half are different colors.

* * * * *